United States Patent
Kim et al.

(10) Patent No.: US 12,196,015 B2
(45) Date of Patent: Jan. 14, 2025

(54) STRUCTURE FOR OPERATING STRIKER CAPABLE OF BEING FASTENED TO DOOR LATCH PART

(71) Applicants: Hyundai Motor Company, Seoul (KR); Kia Corporation, Seoul (KR)

(72) Inventors: Hyong-Don Kim, Yongin-si (KR); Chung-Sik Yim, Anyang-si (KR); Dae-Hee Lee, Incheon (KR); Yong-Hyun Nam, Anyang-si (KR); Kyu-Hoon Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 529 days.

(21) Appl. No.: 17/459,738

(22) Filed: Aug. 27, 2021

(65) Prior Publication Data
US 2022/0205287 A1    Jun. 30, 2022

(30) Foreign Application Priority Data

Dec. 30, 2020 (KR) ..................... 10-2020-0187710

(51) Int. Cl.
| | |
|---|---|
| *B60J 5/04* | (2006.01) |
| *B60J 5/06* | (2006.01) |
| *E05B 77/46* | (2014.01) |
| *E05B 81/06* | (2014.01) |
| *E05B 81/22* | (2014.01) |
| *E05B 81/34* | (2014.01) |
| *E05B 83/38* | (2014.01) |
| *E05B 85/04* | (2014.01) |
| *E05B 85/24* | (2014.01) |

(52) U.S. Cl.
CPC ............. *E05B 83/38* (2013.01); *B60J 5/0479* (2013.01); *B60J 5/06* (2013.01); *E05B 77/46* (2013.01); *E05B 81/06* (2013.01); *E05B 81/22* (2013.01); *E05B 81/34* (2013.01); *E05B 85/045* (2013.01); *E05B 85/243* (2013.01)

(58) Field of Classification Search
CPC ........ E05B 85/16; E05B 85/04; E05B 85/045; E05B 85/243; E05B 85/107; E05B 79/06; E05B 81/06; E05B 81/22; E05B 81/34; E05B 81/36; E05B 81/64; E05B 83/38; E05B 77/46; E05B 15/025; E05B 2015/0265; E05B 15/021; B60J 5/0479; B60J 5/06
See application file for complete search history.

(56) References Cited

FOREIGN PATENT DOCUMENTS

DE    20 2013 012 305    *    1/2013    ............ E05F 15/655

OTHER PUBLICATIONS

Translation of DE 20 2013 012 305: worldwide.espacenet.com. Dec. 14, 2023.*

* cited by examiner

*Primary Examiner* — Michael P Ferguson
*Assistant Examiner* — Thomas L Neubauer
(74) *Attorney, Agent, or Firm* — Slater Matsil, LLP (57) ABSTRACT

An embodiment structure includes a housing configured to be mounted on a door of a vehicle, a casing configured to be movable in the housing, a striker mounted at one side of the casing and configured to be fixed by being caught by a latch part or released, a casing guide unit connected to the casing and configured to guide a forward movement of the casing, an elastic force providing unit configured to apply elastic force in a rearward direction of the casing, and an operating unit configured to move the casing guide unit forward or rearward.

20 Claims, 8 Drawing Sheets

STRUCTURE FOR OPERATING STRIKER CAPABLE OF BEING FASTENED TO DOOR LATCH PART

CROSS-REFERENCE TO RELATED APPLICATIONS

This application claims the benefit of Korean Patent Application No. 10-2020-0187710, filed on Dec. 30, 2020, in the Korean Intellectual Property Office, which application is hereby incorporated herein by reference.

TECHNICAL FIELD

The present invention relates to a structure for operating a striker capable of being fastened to a door latch part.

BACKGROUND

In general, a vehicle has an occupant compartment having a predetermined size in which a driver or an accompanied occupant may be seated, and occupant compartment opening/closing doors are installed on a vehicle body to open or close the occupant compartment.

The occupant compartment opening/closing doors include a type of configuration in which a front door and a rear door are fastened or unfastened to be opened or closed. The types of doors include various types of doors such as opposite sliding doors, opposite swing doors, and mixed sliding and swing doors.

Figure 1A:
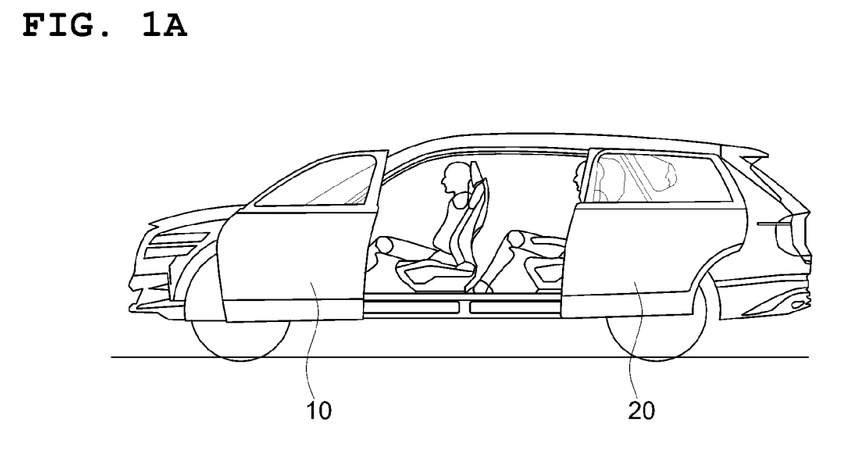
FIG. 1A is a view illustrating opposite sliding doors.

As an example of the occupant compartment opening/closing doors, FIG. 1A illustrates the opposite sliding doors including a first door 10 and a second door 20 which operate to be opened or closed while taking postures opposite to each other. A B-pillar is removed for convenience for a user that enters and exits a vehicle.

Figure 1B:
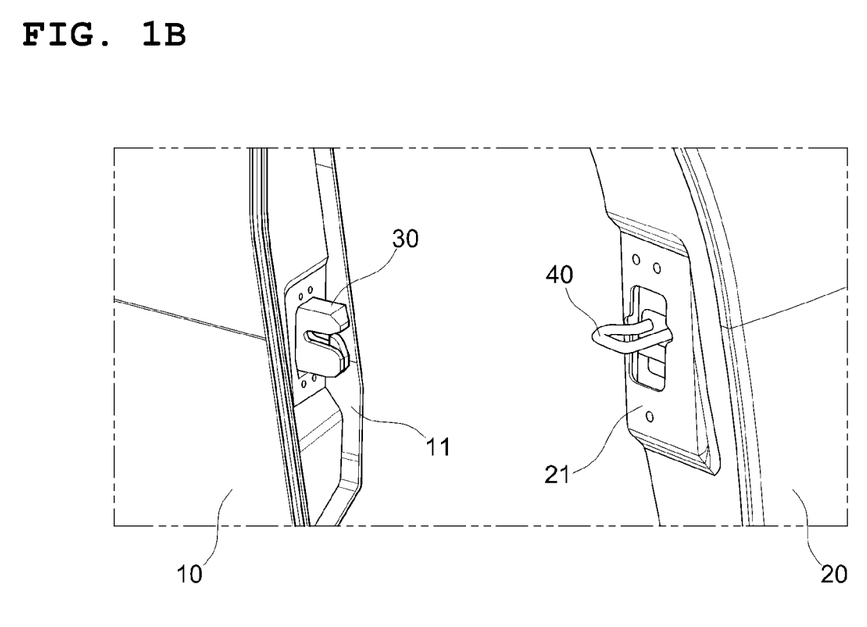
FIG. 1B is a view illustrating a latch part mounted in a first door and a striker mounted in a second door in the related art.

As illustrated in FIG. 1B, in the related art, the occupant compartment opening/closing doors are opened or closed as a door latch 30 mounted in one (first door) of the occupant compartment opening/closing doors and a striker 40 mounted in the other (second door) of the occupant compartment opening/closing doors are fastened or unfastened.

However, because the door latch 30 and the striker 40 illustrated in FIG. 1B are mounted to protrude from the first and second doors 10 and 20, respectively, there is a problem in that a process of forming external appearances of door panels 11 and 21 deteriorates.

Figure 2A:
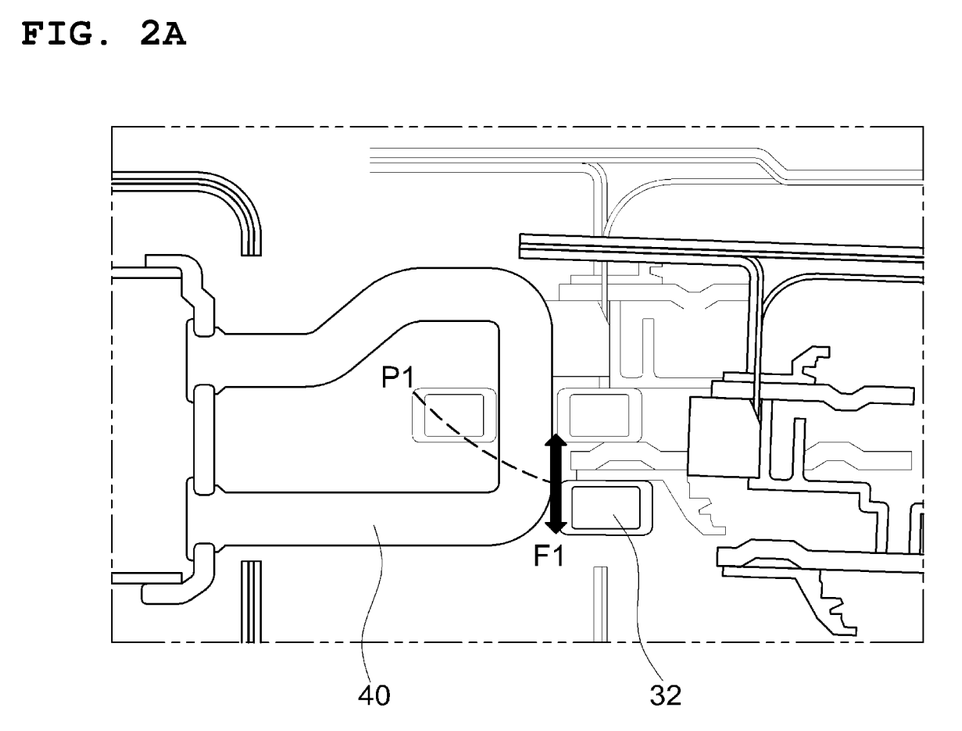
FIG. 2A is a view illustrating a trajectory of a door latch mounted in the first door in the related art while the door is opened.
Figure 2B:
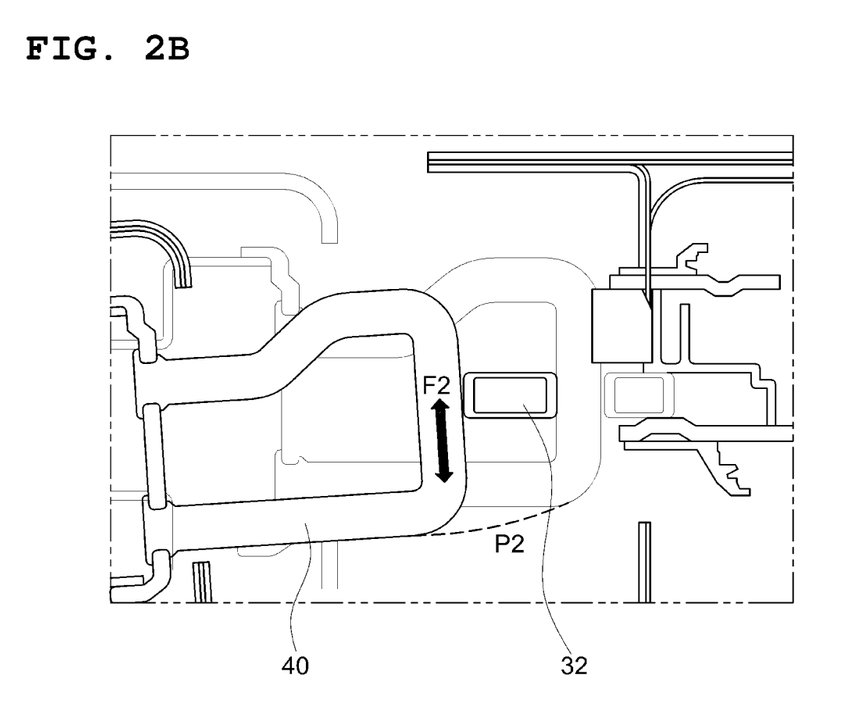
FIG. 2B is a view illustrating a trajectory of the striker mounted in the second door in the related art while the door is opened.

Referring to FIGS. 2A and 2B, because trajectories of the door latch 30 and the striker 40 are different from each other when the doors are opened from the closed state, the door latch 30 and the striker 40 are abraded due to slip friction therebetween, which causes a deterioration in durability. Specifically, frictional force F1 is generated between the latch claw lever 32 and the striker 40 due to a trajectory P1 of the latch claw lever 32 which constitutes the door latch 30 illustrated in FIG. 2A, and frictional force F2 is generated between the latch claw lever 32 and the striker 40 due to a trajectory P2 of the striker 40 illustrated in FIG. 2B. When the first door 10 and the second door 20 are simultaneously opened or closed, frictional forces F1 and F2 are generated to act in opposite directions, which causes abrasion of the door latch 30 and the striker 40.

Figure 3:
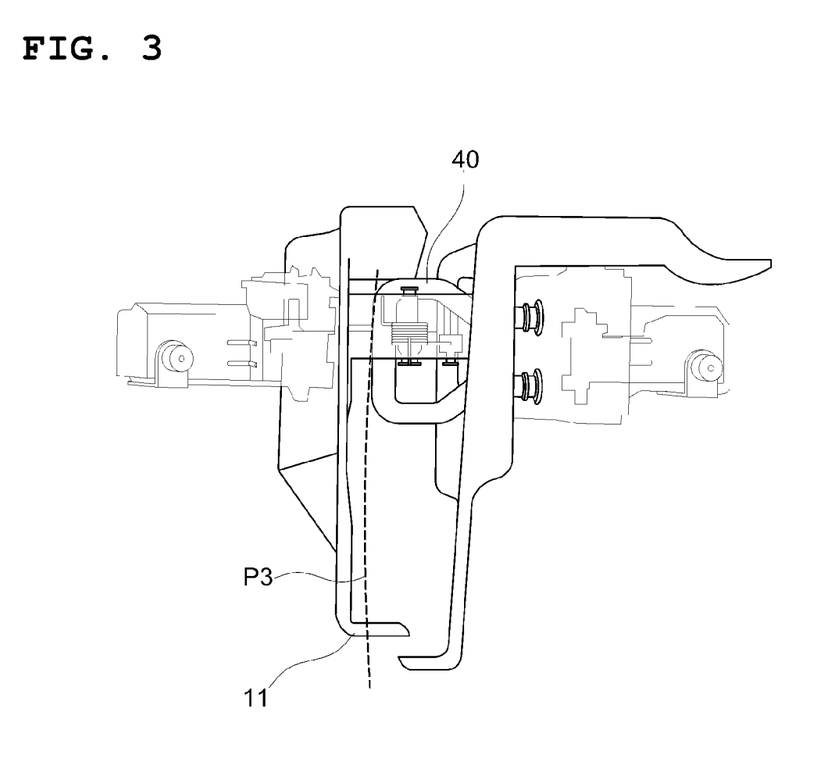
FIG. 3 is a view illustrating a relationship between a fastening direction of the striker and a hinge shaft of the door in the related art.

Meanwhile, referring to FIG. 3, when the door latch 30 and the striker 40 are applied to the opposite swing doors as an example of the occupant compartment opening/closing doors, the striker 40 may be caught by the panel ii of the first door, which faces the striker 40, due to a trajectory P3 of the striker 40 when the second door is opened first in the state in which the doors are closed. As a result, there is a problem in that the first door needs to be opened first before the second door is opened.

SUMMARY

The present invention relates to a structure for operating a striker capable of being fastened to a door latch part. Particular embodiments relate to a structure for operating a striker, the structure being capable of easily opening and closing a door by moving the striker in one direction so that the striker is fastened to a latch part after the door is closed, and by moving the striker in the other direction so that the striker is released from the latch part before the door is opened.

Embodiments of the present invention provide a new type of structure, in which a striker is received in a door when the door is opened, and the striker protrudes to the outside of the door only when the striker is intended to be fastened to the latch part in a state in which the door is closed, such that it is possible to improve a process of forming an external appearance of a panel while removing slip friction between the latch part and the striker.

An embodiment of the present invention provides a structure for operating a striker capable of being fastened to a door latch part to keep a door locked, the structure including a housing mounted on the door, a casing movable in the housing, a striker mounted at one side of the casing and fixed by being caught by the latch part or released, a casing guide unit connected to the casing and configured to guide a forward movement of the casing, an elastic force providing unit configured to apply elastic force in a rearward direction of the casing, and an operating unit configured to move the casing guide unit forward or rearward. In this case, the operating unit may move the casing guide unit forward so that the striker received in the housing protrudes to the outside of the housing while the door is closed, and the operating unit may move the casing guide unit rearward when the striker is caught by the latch part.

According to embodiments of the present invention, the following effects are achieved.

First, the striker and the latch part do not protrude to the outside while the door moves between the opened state and the closed state, and as a result, a process of forming external appearances of panels of the doors does not deteriorate.

Second, the striker is quickly received in the housing while the operation of opening the door in the closed state is performed, and as a result, the opening operation time is not delayed.

Third, there occurs no slip friction due to the trajectories of the latch part and the striker during the process of opening or closing the doors, and as a result, there occurs no problem of deterioration in durability.

Fourth, there is no limitation that the direction in which the striker is fastened to the latch part needs to be perpendicular to the hinge shaft of the door.

DETAILED DESCRIPTION OF ILLUSTRATIVE EMBODIMENTS

Hereinafter, a structure for operating a striker capable of being fastened to a door latch part according to exemplary embodiments of the present invention will be described in detail with reference to the drawings. Terms or words used herein should not be interpreted as being limited to general or dictionary meanings and should be interpreted with meanings and concepts which conform to the technical spirit of the present invention based on a principle that an inventor can appropriately define a concept of a term in order to describe his/her own invention by the best method.

Embodiments of the present invention relate to a structure for moving a striker 225 to be fastened to a latch part 100 while a door is closed or opened. Embodiments of the present invention may be applied to vehicles having various types of doors, such as sliding doors, swing doors, and mixed sliding and swing doors.

Meanwhile, according to exemplary embodiments of the present invention, no B pillar is mounted on the vehicle. In a case in which a front door and a rear door are used to open or close an interior of the vehicle, the latch part and the striker part need to be mounted in the doors, respectively, and fastened at positions opposite to each other.

Figure 4:
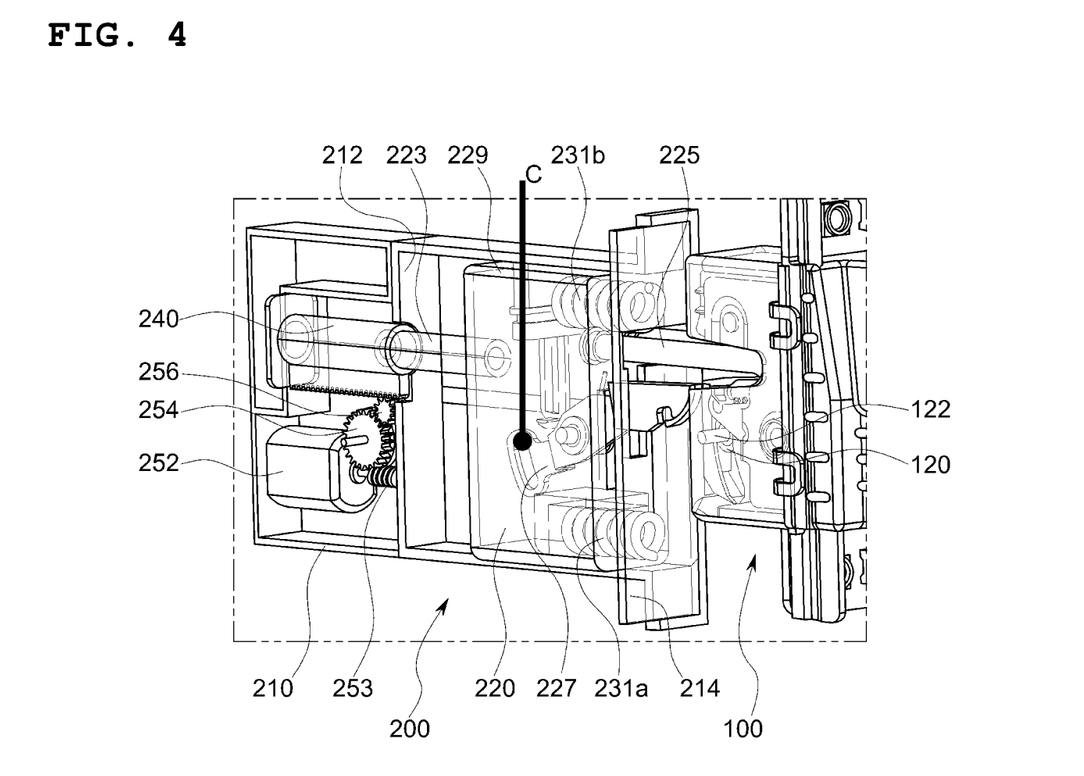
FIG. 4 is a view illustrating a configuration of a structure for operating a striker according to an exemplary embodiment of the present invention.

FIG. 4 is a view illustrating a configuration of a structure for operating the striker according to an exemplary embodiment of the present invention.

As illustrated in FIG. 4, the structure for operating the striker capable of being fastened to the door latch part includes the latch part 100 mounted in a first door 10, and a striker part 200 mounted in a second door 20. In this case, any one of the first and second doors 10 and 20 is a front door, and the other of the first and second doors 10 and 20 is a rear door.

The latch part 100 includes a latch claw lever 100. According to the exemplary embodiment of the present invention, the latch part 100 is mounted in the first door 10, and the latch part 100 does not protrude to the outside of the first door 10.

The latch claw lever no has an insertion groove 112 into which the striker 225 may be inserted, and legs of the latch claw lever no are provided at both sides of the insertion groove 112. The latch claw lever 110 is rotatably connected to the first door 10.

A fixing lever 120 is provided at one side of the latch claw lever 110 and may rotate in conjunction with the latch claw lever no. The fixing lever 120 serves to maintain a posture of the latch claw lever no when the latch claw lever no is rotated and takes the posture at which the striker 225 may be caught. The fixing lever 120 also serves to maintain a posture of the latch claw lever no when the latch claw lever no is rotated and takes the posture at which the striker 225 cannot be caught. A fixing lever rotating unit 122 is provided at one side of the fixing lever 120 and may rotate the fixing lever 120.

The striker part 200 includes a housing 210, a casing 220, elastic force providing units 231a and 231b, a casing guide unit 240, and an operating unit.

The housing 210 is fixedly mounted at one side of the second door 20 (a side directed toward the first door). The housing 210 has therein a space that may receive the casing 220 and the operating unit. An internal space of the housing 210 is divided into a front space and a rear space based on an intermediate sidewall 212. In this case, the term 'front' means a forward direction in which the casing 220 moves toward the latch part 100, and the term 'rear' means a direction opposite to the forward direction. The intermediate sidewall 212 has a hole, and the hole is sized such that the casing guide unit 240 to be described below may penetrate the hole.

An interface plate 214 is mounted at a front side of the housing 210. Interfaces of the respective doors may face each other when the first door 10 and the second door 20 are closed, and in this case, the interface plate 214 may be disposed to be close to the interface of the second door 20. The interface plate 214 may serve as a front sidewall of the housing 210. The interface plate 214 has holes through which the striker 225 and the release lever 227 may enter and exit.

The casing 220 may move forward and rearward in the housing 210. Specifically, in the exemplary embodiment of the present invention, the casing 220 is positioned in the front space of the housing 210 and may move between the interface plate 214 and the intermediate sidewall 212. Meanwhile, there is no limitation to a shape of the casing 220.

A protruding and extending guide connecting portion 223 is provided at a rear side of the casing 220. In the exemplary embodiment of the present invention, the guide connecting portion 223 has, but is not limited to, an approximately cylindrical shape. A function of the guide connecting portion 223 will be described below.

The striker 225 is fixedly mounted in the casing 220, and the release lever 227 is rotatably mounted in the casing 220. Therefore, when the casing 220 moves, the striker 225 and the release lever 227 may also move together.

The release lever 227 serves to assist in releasing the locking between the striker 225 and the latch part 100 and may rotate about a rotary shaft X provided on the casing 220. A lever groove 228 into which the fixing lever rotating unit 122 may be inserted is provided at one end of the release lever 227, and a cable C to be described below is connected to the other end of the release lever 227. Meanwhile, in the exemplary embodiment of the present invention, the portion of the release lever 227, which is in contact with the fixing lever rotating unit 122, has a groove shape, but may be variously formed. A return spring is provided on the rotary shaft X and provides rotational restoring force to the release lever 227.

A cable connecting portion 229 is provided on an upper portion of the casing 220 and the cable C may penetrate the cable connecting portion 229. One end of the cable C is connected to the release lever 227, and the other end of the cable C is connected to a component disposed outside the casing 220 through the cable connecting portion 229. When the cable C is pulled by external force, the release lever 227 may be rotated in one direction about the rotary shaft X. In contrast, when the external force is eliminated, the release lever 227 may be rotated in the other direction by the spring.

The elastic force providing units 231a and 231b apply elastic force in a rearward direction of the casing 220. In the exemplary embodiment of the present invention, the elastic force providing units 231a and 231b are configured as compressive springs but may have various configurations for providing the elastic force. One end of each of the elastic force providing units 231a and 231b is connected to the casing 220, and the other end of each of the elastic force providing units 231a and 231b is connected to the interface plate 214 which is the front sidewall.

The casing guide unit 240 is positioned at a rear side of the casing 220. Specifically, in the exemplary embodiment of the present invention, the casing guide unit 240 is positioned in the rear space of the housing 210 and may move to the front space through the hole formed in the intermediate sidewall 212. The casing guide unit 240 has a hole into which the guide connecting portion 223 may be penetratively inserted. When the guide connecting portion 223 is inserted into the casing guide unit 240, the casing 220 may move forward or rearward by being guided by the casing guide unit 240.

Gear teeth are provided in a longitudinal direction at a lower side of the casing guide unit 240. The gear teeth are configured to engage with the operating unit to be described below. Meanwhile, there is no limitation to a position at which the gear teeth are formed on the casing guide unit 240.

The operating unit is configured to move the casing guide unit 240 and includes a motor 252 and a gear group.

The motor 252 provides driving power for moving the casing guide unit 240. A rotary pin is provided at one side of the motor 252, and a driving gear 253 is provided on an outer circumferential surface at one side of the rotary pin. In the exemplary embodiment of the present invention, the driving gear 253 serves as a worm gear.

The gear group serves to transmit driving power, which is generated by the motor 252, to the casing guide unit 240 and includes a driven gear 254 and a connection gear 256. The driven gear 254 is a gear for transmitting rotational force of the motor 252 to the connection gear 256 and takes a posture approximately perpendicular to the rotary pin of the motor 252. Gear teeth, which mesh with the driving gear 253, are formed on an outer circumferential surface at one side of the driven gear 254, and gear teeth, which mesh with the connection gear 256, are formed on an outer circumferential surface at the other side of the driven gear 254. In the exemplary embodiment of the present invention, an axial direction of the driven gear 254 and an axial direction of the connection gear 256 are provided in parallel with each other. The connection gear 256 engages with the driven gear 254 and the gear teeth formed on the casing guide unit 240. However, the types, positions, and numbers of gear groups are not limited as long as the gear group may transmit driving power of the motor 252 to the casing guide unit 240.

When the motor 252 rotates in one direction, the gear group rotates, and the casing guide unit 240 moves forward. When the motor 252 rotates in the other direction, the gear group rotates, and the casing guide unit 240 moves rearward.

Meanwhile, in the exemplary embodiment of the present invention, the structure may further include a configuration for guiding the movement of the casing 220. Specifically, a guide groove for guiding the movement of the casing 220 may be formed at an upper or lower side of the housing 210 in the longitudinal direction of the housing 210, and a guide protrusion, which may be inserted into the guide groove, may be formed at an upper or lower side of the casing 220. However, there is no limitation to the number of guide grooves, the number of guide protrusions, and the positions at which the guide grooves and the guide protrusions are formed.

Figure 5A:
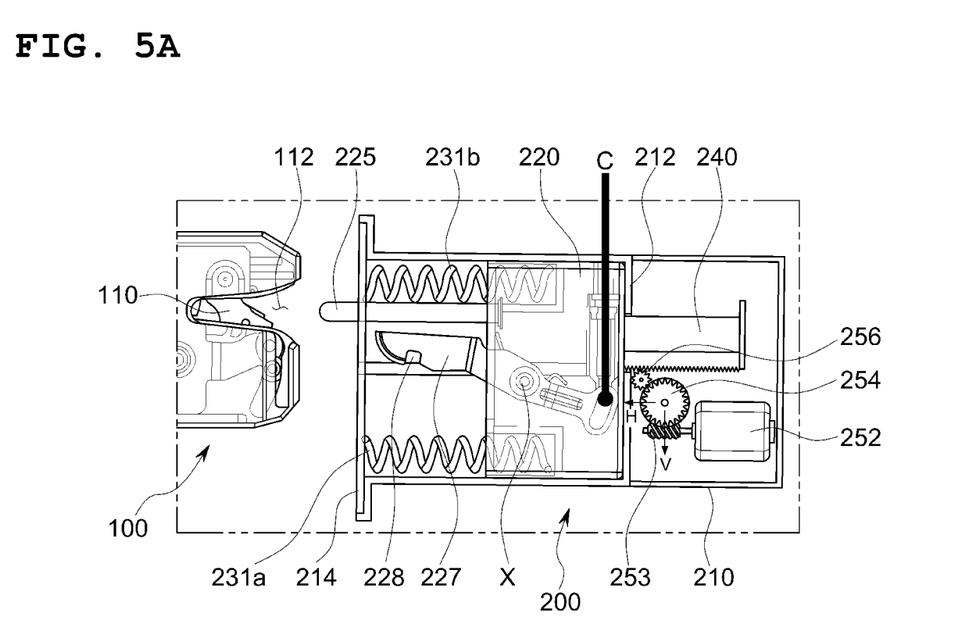
FIGS. 5A to 5C are views illustrating a process in which the structure for operating the striker operates while a door in an opened state is closed.
Figure 5B:
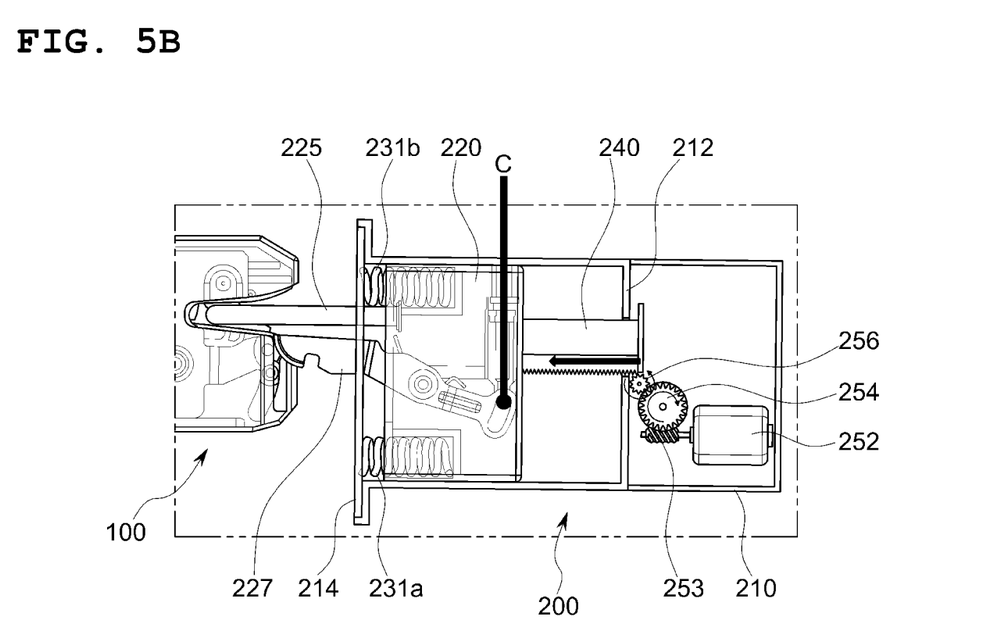

FIGS. 5A to 5B are views illustrating a process in which the structure for operating the striker operates while the door in the opened state is closed.

Figure 5C:
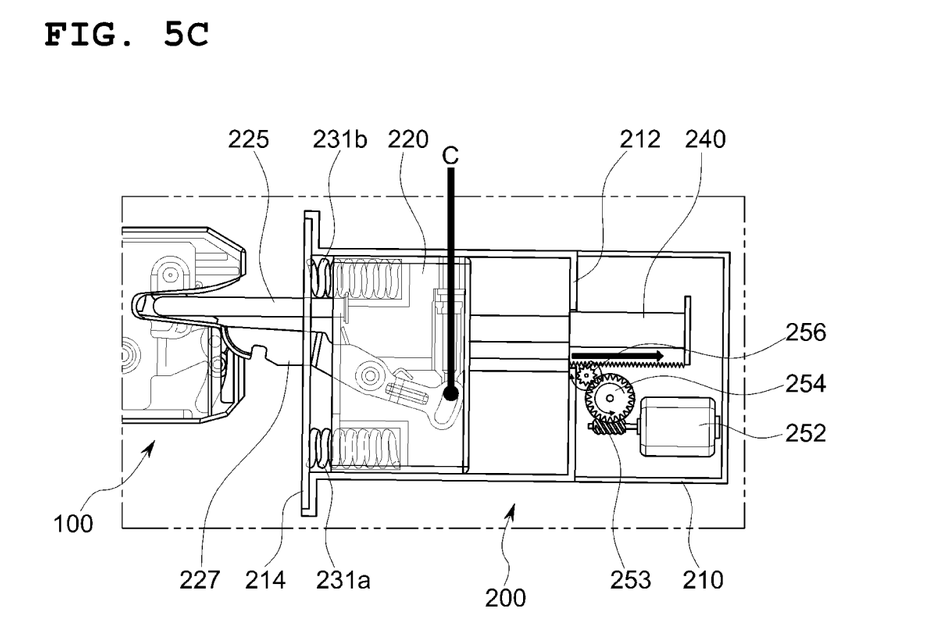

Hereinafter, a process of operating the structure for operating the striker capable of being fastened to the door latch part according to the exemplary embodiment of the present invention will be described with reference to FIGS. 5A to 5C. FIGS. 5A to 5C illustrate the process of operating the striker according to the exemplary embodiment of the present invention after the door is closed. The striker 225 is received in the housing and does not protrude to the outside of the door while the door is closed.

Referring to FIG. 5A, while the door in the opened state is closed, the casing 220 is positioned in the front space in one direction (a right direction in FIG. 5A), and the striker 225 is received in the housing 210. The casing guide unit 240 is positioned in the rear space, and the guide connecting portion 223 is completely inserted into the casing guide unit 240. Further, the elastic force providing units 231a and 231b are stretched and do not provide the elastic force to the casing 220.

Thereafter, referring to FIG. 5B, when the closed state of the door is recognized by an Ajar switch, the motor 252 rotates in one direction, and the casing guide unit 240 moves forward by means of the gear group. In this case, one end of the casing guide unit 240 pushes the casing 220 and the casing 220 also moves forward. In this case, the casing guide unit 240 may move from the rear space to the front space through the hole formed in the intermediate sidewall 212. As the casing 220 moves forward, the striker 225 and the release lever 227 move toward the latch part 100. At the same time, the elastic force providing units 231a and 231b are compressed, such that the elastic force is applied to the casing 220 in the rearward direction of the casing 220. When the striker 225 is moved toward the latch part 100, inserted into the insertion groove 112 of the latch part 100, and then completely fastened by the latch claw lever no, a fastening completion signal is generated, and the operation of the motor 252 in one direction is stopped. In this case, the elastic force providing units 231a and 231b are completely pressed.

Thereafter, referring to FIG. 5C, almost simultaneously with the stoppage of the operation of the motor 252, the motor 252 rotates in the other direction, and the casing guide unit 240 moves rearward by means of the gear group. In this case, since the casing 220 is fastened to the latch part 100 through the striker 225, only the casing guide unit 240 may move rearward. When the rearward movement of the casing guide unit 240 is completed, the rotation of the motor 252 is stopped. The state in which the process illustrated in FIG. 5C is completed is maintained until the operation of opening the door is performed.

Thereafter, when the operation of opening the door is performed, for example, when the user clicks a door open button, an operation of receiving the striker 225 in the housing 210 is performed before the door is opened. Specifically, as the cable C is pulled, the release lever 227 and the fixing lever 120 are rotated, and the latch claw lever no is released, such that the striker 225 is released from the latch claw lever no. In this case, since the elastic force is applied, in the rearward direction, to the casing 220 by the elastic force providing units 231a and 231b, the casing 220 is quickly moved rearward when the casing 220 is released from the striker 225, such that the casing 220 is received in the housing 210. In this case, the guide connecting portion 223 is inserted into the casing guide unit 240 and moved rearward by being guided by the casing guide unit 240.

Thereafter, when the striker 225 is completely received, the door is opened depending on an opening signal for the door.

According to the exemplary embodiment of the present invention, the striker 225 and the latch part 100 do not protrude to the outside while the door moves between the opened state and the closed state, and as a result, a process of forming external appearances of panels of the doors does not deteriorate.

According to the exemplary embodiment of the present invention, the striker 225 is quickly received in the housing 210 while the operation of opening the door in the closed state is performed, and as a result, the opening operation time is not delayed.

In the related art, slip friction occurs between the latch part 100 and the striker 225 due to the trajectories of the latch part 100 and the striker 225 during the process of opening or closing the doors 10 and 20, which causes a problem with durability of the latch part 100 and the striker 225. However, in the exemplary embodiment of the present invention, there is little likelihood that slip friction occurs between the striker 230 and the latch part 100 during the process of opening or closing the doors.

In the related art, the fastening direction of the striker 225 and the hinge shafts of the doors need to be perpendicular to each other. However, in the exemplary embodiment of the present invention, there is no such limitation.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure comprising:
   a latch part mountable in a first door of a vehicle;
   a striker part mountable in a second door of the vehicle, wherein the striker part comprises:
      a housing configured to be mounted on the second door;
      a casing movable in the housing;
      a striker mounted at one side of the casing and configured to be fixed by being caught by the latch part or released;
      a casing guide unit connected to the casing and configured to guide a forward movement of the casing;
      an elastic force providing unit configured to apply elastic force in a rearward direction of the casing; and
      an operating unit configured to move the casing guide unit forward or rearward;
   wherein the latch part includes a latch claw lever;
   wherein the latch claw lever has an insertion groove into which the striker is insertable;
   wherein legs of the latch claw lever are provided at both sides of the insertion groove;
   wherein the latch claw lever is rotatably connected to the first door;
   wherein a fixing lever is provided at one side of the latch claw lever and is rotatable in conjunction with the latch claw lever;
   wherein the fixing lever is configured to maintain a posture of the latch claw lever when the latch claw lever is rotated and to take the posture at which the striker is caught; and
   wherein the fixing lever is configured to maintain a posture of the latch claw lever when the latch claw lever is rotated and to take the posture at which the striker is not caught.

2. The structure of claim 1, wherein the housing is divided by an intermediate sidewall into a front space in which the casing is positioned and a rear space in which the casing guide unit is positioned.

3. The structure of claim 2, wherein one end of the casing guide unit is configured to move to the front space through a hole formed in the intermediate sidewall, such that the casing moves forward.

4. The structure of claim 3, wherein the casing guide unit is configured to move to the rear space in a state in which the striker is caught by the latch part.

5. The structure of claim 3, wherein a movement of the casing is restricted by a front sidewall provided at a front side of the housing when the casing moves forward, and the movement of the casing is restricted by the intermediate sidewall when the casing moves rearward.

6. The structure of claim 1, wherein the casing includes a guide connecting portion protruding rearward and wherein the casing guide unit includes an insertion hole into which the guide connecting portion is configured to be inserted.

7. The structure of claim 1, wherein the elastic force providing unit comprises a spring.

8. The structure of claim 1, wherein a first end of the elastic force providing unit is connected to the casing, and a second end of the elastic force providing unit is connected to a front sidewall provided at a front side of the housing.

9. The structure of claim 1, wherein the housing includes a guide groove configured to guide the movement of the casing, and wherein the casing includes a guide protrusion configured to be inserted into the guide groove.

10. The structure of claim 1, wherein the elastic force providing unit is configured to apply elastic force to the casing in the rearward direction of the casing while the second door is closed, and wherein the casing is configured to be received in the housing by elastic restoring force when the striker and the latch part are unfastened by an operation of opening the second door.

11. The structure of claim 1, wherein the operating unit is configured to move the casing guide unit forward so that the striker received in the housing protrudes to an outside of the housing while the second door is closed, and wherein the operating unit is configured to move the casing guide unit rearward when the striker is caught by the latch part.

12. A structure comprising:
   a latch part mountable in a first door of a vehicle;
   a striker part mountable in a second door of the vehicle, wherein the striker part comprises:
      a housing configured to be mounted on the second door;
      a casing configured to be movable in the housing;
      a striker mounted at one side of the casing and configured to be fixed by being caught by the latch part or released;
      a casing guide unit connected to the casing and configured to guide a forward movement of the casing;
      an elastic force providing unit configured to apply elastic force in a rearward direction of the casing; and an operating unit configured to move the casing guide unit forward or rearward, wherein the operating unit comprises a motor and a gear group configured to engage with the motor and to transmit rotational force of the motor to the casing guide unit;

wherein the latch part includes a latch claw lever;

wherein the latch claw lever has an insertion groove into which the striker is insertable;

wherein legs of the latch claw lever are provided at both sides of the insertion groove;

wherein the latch claw lever is rotatably connected to the first door;

wherein a fixing lever is provided at one side of the latch claw lever and is rotatable in conjunction with the latch claw lever;

wherein the fixing lever is configured to maintain a posture of the latch claw lever when the latch claw lever is rotated and to take the posture at which the striker is caught; and wherein the fixing lever is configured to maintain a posture of the latch claw lever when the latch claw lever is rotated and to take the posture at which the striker is not caught.

13. The structure of claim 12, wherein the gear group comprises:
a driven gear configured to mesh with a driving gear mounted in the motor; and
a connection gear configured to mesh with gear teeth formed on the driven gear and the casing guide unit.

14. The structure of claim 13, wherein the gear teeth of the casing guide unit are formed in a longitudinal direction.

15. A vehicle comprising:
a vehicle body;
a first vehicle door and a second vehicle door coupled to the vehicle body;
a latch part mounted in the first vehicle door;
a housing mounted in the second vehicle door;
a casing configured to be movable in the housing;
a striker mounted at one side of the casing and configured to be fixed by being caught by the latch part or released;
a casing guide unit connected to the casing and configured to guide a forward movement of the casing;
an elastic force providing unit configured to apply elastic force in a rearward direction of the casing; and
an operating unit configured to move the casing guide unit forward or rearward;
wherein the latch part includes a latch claw lever;
wherein the latch claw lever has an insertion groove into which the striker is insertable;
wherein legs of the latch claw lever are provided at both sides of the insertion groove;
wherein the latch claw lever is rotatably connected to the first vehicle door;
wherein a fixing lever is provided at one side of the latch claw lever and is rotatable in conjunction with the latch claw lever;
wherein the fixing lever is configured to maintain a posture of the latch claw lever when the latch claw lever is rotated and to take the posture at which the striker is caught; and
wherein the fixing lever is configured to maintain a posture of the latch claw lever when the latch claw lever is rotated and to take the posture at which the striker is not be caught.

16. The vehicle of claim 15, wherein:
the housing is divided by an intermediate sidewall into a front space in which the casing is positioned and a rear space in which the casing guide unit is positioned; and
one end of the casing guide unit is configured to move to the front space through a hole formed in the intermediate sidewall, such that the casing moves forward.

17. The vehicle of claim 16, wherein the casing guide unit is configured to be movable to the rear space in a state in which the striker is caught by the latch part.

18. The vehicle of claim 16, wherein a movement of the casing is restricted by a front sidewall provided at a front side of the housing when the casing moves forward, and the movement of the casing is restricted by the intermediate sidewall when the casing moves rearward.

19. The vehicle of claim 15, wherein:
the casing includes a guide connecting portion protruding rearward; and
the casing guide unit includes an insertion hole into which the guide connecting portion is configured to be inserted.

20. The vehicle of claim 15, wherein the elastic force providing unit comprises a spring.

* * * * *

UNITED STATES PATENT AND TRADEMARK OFFICE
CERTIFICATE OF CORRECTION

PATENT NO. : 12,196,015 B2
APPLICATION NO. : 17/459738
DATED : January 14, 2025
INVENTOR(S) : Kim et al.

Page 1 of 1

It is certified that error appears in the above-identified patent and that said Letters Patent is hereby corrected as shown below:

In the Claims

In Column 10, in Claim 15, Line 20, after "not" delete "be".

Signed and Sealed this
Eighteenth Day of February, 2025

Coke Morgan Stewart
*Acting Director of the United States Patent and Trademark Office*